UNITED STATES PATENT OFFICE.

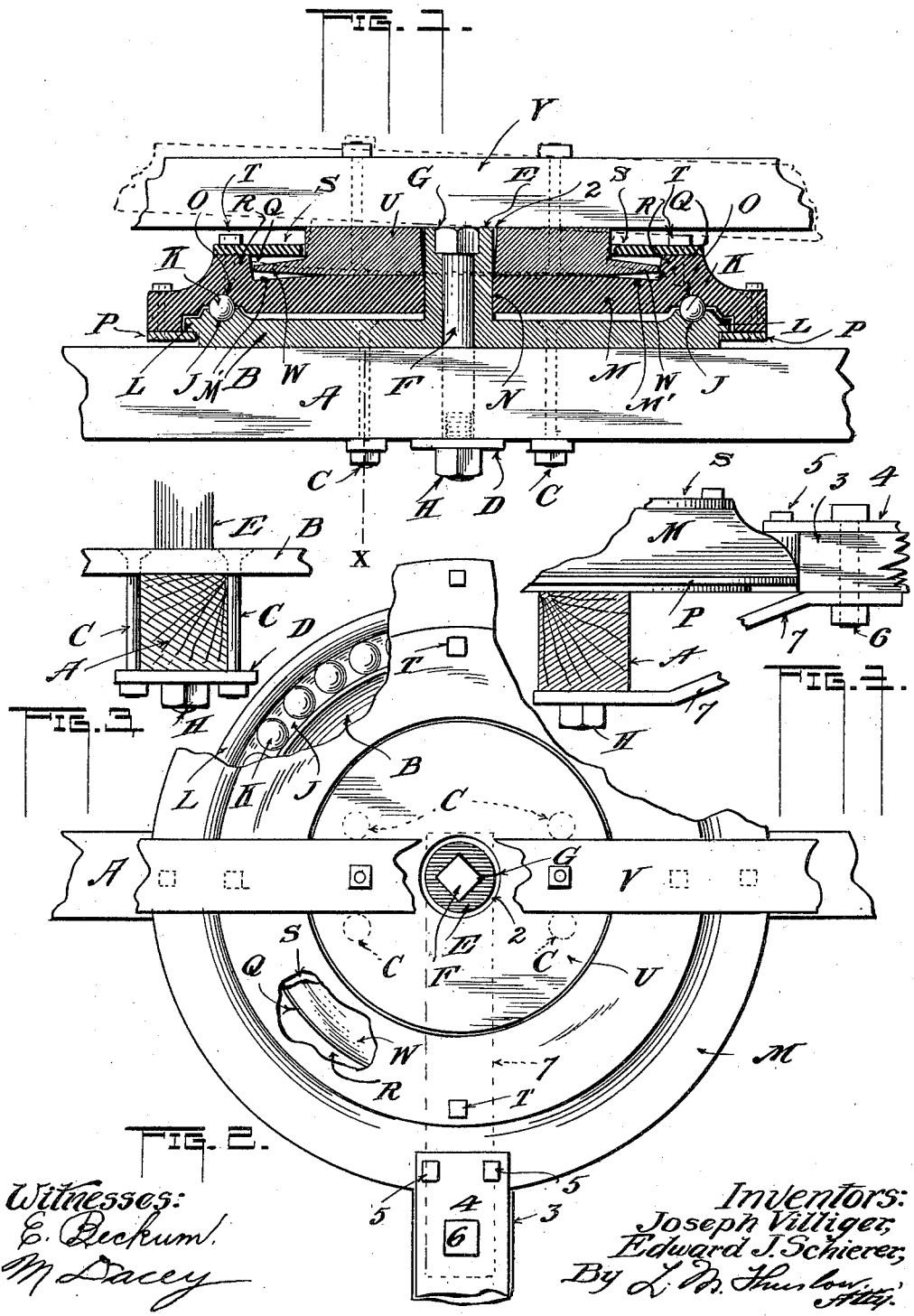

JOSEPH VILLIGER AND EDWARD J. SCHIERER, OF METAMORA, ILLINOIS.

FIFTH-WHEEL.

1,078,709.  Specification of Letters Patent.  Patented Nov. 18, 1913.

Application filed August 25, 1913. Serial No. 786,525.

*To all whom it may concern:*

Be it known that we, JOSEPH VILLIGER and EDWARD J. SCHIERER, citizens of the United States, residing at Metamora, in the county of Woodford and State of Illinois, have invented certain new and useful Improvements in Fifth-Wheels; and we do hereby declare that the following is a full, clear, and exact description of the invention, which will enable others skilled in the art to which it appertains to make and use the same.

This invention relates to a fifth wheel for vehicles.

The object of the invention is to furnish a structure in a fifth wheel which, while strong and rigid so as to stand great strain, the bolster and axle will have free vertical movement relatively in order that when the wheels of the vehicle drop into depressions or rise in passing over uneven places the wagon box and gearing will not be strained or twisted especially when carrying heavy loads.

The construction of fifth wheels ordinarily is such that the bolster above the front axle is not permitted to rock vertically under strains as the wheels rise and fall in passing over obstructions or into depressions with the result that the wagon box is often greatly and unduly strained out of shape, and loosened in its parts and especially when transporting very heavy loads. Also where the center of gravity is very high as in carrying hay piled high upon a rack the vehicle is often overturned because of the rigid connection.

It is the purpose of our invention, in view of the foregoing, to construct a fifth wheel that will permit the box or the wagon bed to accommodate itself to the differences in elevation of the wheels whereby the straining of the box or bed will be eliminated and overturning cannot take place. Having this in view we shall proceed to the description of the invention aided by the accompanying drawing, in which, Figure 1 is a sectional elevation of the fifth wheel showing a part of the bolster and a part of the front wagon axle. Fig. 2 is a plan of the same. Fig. 3 is a transverse section of the axle and a part of a lower plate of the fifth wheel on line $x\ x$, Fig. 1. Fig. 4 is also a transverse section of the axle and a part of the fifth wheel and a reach of the wagon.

A indicates the axle and B is a lower circular plate of the fifth wheel secured to the axle by means of a series of pairs of bolts C which, together with a tie member D beneath the axle and through which the bolts extend, forms a clip around said axle, as clearly shown in Fig. 3. Formed with said plate B is an upwardly extending boss or hub E centrally bored to receive a king bolt F the head of which lies in a socket G which conforms to the shape of said head preventing the bolt from turning. Said king bolt extends through the axle in the usual manner and receives the usual nut H. Near the outer edge of the plate B is a race-way J for receiving a series of balls K and outward from said race-way the plate is provided with a projecting flange L the purpose of which will appear presently.

M is an upper plate centrally bored at N to receive the said hub E of the plate B. This plate M is likewise provided with a race-way O to lie above and receive the balls K, and, further, said plate is extended beyond and overhangs and incloses the periphery of the plate B. Secured to its overhanging portion is a ring P which lies beneath the flange L of said plate B for preventing the separation of said plates. The upper surface of the plate M is further provided with a recess Q the bottom of which is flat for its greater portion surrounding the bore N, and thence the said bottom of the recess is extended into an annular depression formed by angling the surface of the metal downward as indicated at M'.

R is an annular flange as a part of the plate surrounding the recess upon which is mounted a ring S secured in place by a series of cap screws T for example. This ring overhangs the recess Q and within the latter is a plate U to which is secured the usual bolster V in any suitable manner. This plate U lies within and preferably extends above the ring S so as to receive the bolster, and is provided with an annular flange W lying beneath the said ring. The bottom of the plate U described has a flat or plane surface to rest upon the flat or plane surface of the plate M at the bottom of the recess Q while the lower surface of the flange is beveled at an angle upward or at an opposite angle to that of the surface M' as clearly indicated in Fig. 1 leaving a space between said flange and said plate M. Again, the upper surface of the flange is beveled downward toward its edge as clearly shown.

2 indicates a central upwardly flared bore for the plate U, said bore at the lower side of the plate being slightly larger than the boss E, and considerably larger at the upper surface of the said plate.

3 is the usual reach extending forward from the rear wagon-axle (not shown), its forward end in the present instance abutting upon the periphery of the plate M, Fig. 4, there being a strap 4 secured to the latter by means of bolts 5, and also secured to said reach 3 by means of a bolt 6 which extends through the latter and also through any usual brace 7 which is secured beneath the axle A by the king bolt H and its nut described. This is somewhat common practice and of itself is not new. The structure serves, however, to firmly brace the plate M, holding it rigid relatively to the reach while the axle and the lower plate B may turn beneath and relatively to it, it being clear that the bolster and the plate U may turn relatively to the plate M beneath the ring S described. Since the plate B is secured rigidly to the axle and the plate M is held rigid with relation to the plate B through the ring P, except being permitted to rotate, it is clear that there can be no rocking motion other than a rotary one, except a vertical one of the plate U within the recess Q.

The broken lines in Fig. 1 indicate the movement the plate U and the bolster may have with respect to the other parts of the structure as the wagon box rocks or as the axle and its plates B and M may rock beneath the plate U. By making the flange W relatively thin it may have considerable latitude or vertical movement within the recess Q or as much as in practice is found necessary, and sufficient space is left between the inner edge of the ring S and the upward extension of the plate so that the described free movement can take place. Again, by flaring the recess 2 which surrounds the boss or hub E of the plate B the rocking movement will not be limited. Said boss or hub assists in holding the plates B and U centrally and takes the side strains imposed upon them but permits their free rotary movement. It is observed that by letting the head of the king bolt H into the socket G of the boss or hub it will not interfere with the free turning movement of the bolster. In actual practice the whole structure is thoroughly rigid except for the rocking movement provided for the plate U and the required rotary movement, and under heavy loads no straining of the wagon bed can occur and with a high center of gravity overturning of the vehicle is entirely avoided.

The bearing surfaces of the plates M and U are preferably flat for the greater portion in order that there will be no rocking movement of the bolster in shifting the position of the load upon the wagon bed as might be caused by persons entering or leaving the wagon or in loading or unloading goods and so that when a preponderance of weight is at one side of the wagon bed the bolster will not sag toward that side. The beveled surfaces, however, admit of the required tilting due to the causes previously mentioned.

Having thus described our invention which may be varied as to details of construction without departing from the intent of the invention and the spirit of the following claims, we claim:—

1. The combination with an axle and a part adapted to turn relatively thereto, of a member carried in the part and adapted to swing relatively to the same in a horizontal plane, and adapted for a rocking movement thereon.

2. The combination of an axle including a plate secured thereon, a second plate rotatably mounted on the first, a member including a bolster, associated with the second described plate and adapted to rotate relatively thereto and rock thereon vertically, and means carried by the member and said second described plate to hold said member and plate in connected relation.

3. The combination with an axle and a bearing plate and a plate rotatably mounted upon said bearing plate, of a member seated in the second described plate and adapted to rotate thereon and rock vertically with respect thereto, and means carried by the said second described plate and adapted to engage and limit the vertical rocking movement of the member.

4. The combination of an axle and a bearing plate fixed relatively thereto, a second plate rotatably mounted upon the first, a member rotatably mounted by the second described plate and adapted to rock vertically thereon and including a projecting part, and a projecting part on the second described plate to engage that of said member in extremes of the rocking movement of the latter.

5. The combination of an axle and a bearing plate fixed relatively thereto, a second plate rotatably mounted upon the first, means to prevent the movement of the same relatively other than the said rotary movement, the said second plate including a substantially flat upper surface for its greater portion and having an annular depression outside of and surrounding the flat portion, a member adapted to rock relatively to the second plate, and also having a flat under surface for its greater portion bearing upon that of the plate and having a beveled annular surface surrounding said portion and formed at an opposite angle to that of the second described plate, and means to hold hanging and spaced from the flange of the